Patented Feb. 7, 1950

2,496,958

UNITED STATES PATENT OFFICE 2,496,958

1-ALKYL-BENZYLAMINOPIPERIDINES AND THEIR PRODUCTION

Robert H. Reitsema, Kalamazoo, Mich., assignor to The Upjohn Company, Kalamazoo, Mich., a corporation of Michigan No Drawing. Application June 18, 1949, Serial No. 100,088

6 Claims. (Cl. 260—293)

This invention relates to 1-alkyl-benzylaminopiperidines and salts thereof with acids. This application is a continuation in part of applications Serial No. 24,426, now abandoned, filed April 30, 1948, and Serial No. 29,413, now abandoned, filed May 26, 1948. The compounds of this invention may be represented by the formula:

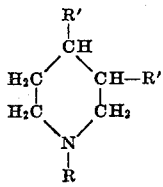

wherein R is a lower-alkyl group containing from one to seven carbon atoms, inclusive, one R' is hydrogen and the other R' is the benzylamino group having the formula $C_6H_5CH_2NH-$.

The compounds of this invention are useful as intermediates in the synthesis of therapeutically-active tertiary amines as disclosed in copending applications Serial No. 24,422, now abandoned, filed April 30, 1948, and Serial No. 29,414, now abandoned, filed May 26, 1948, and in concurrently filed copending application Serial No. 100,087, now Patent 2,496,957. They are also useful in the preparation of surface active agents.

The amines of this invention are high-boiling liquids, soluble in most organic liquids and only slightly soluble in water. The compounds are basic substances which form stable salts with mineral acids such as hydrochloric, hydrobromic, and sulfuric acids; organic carboxylic acids such as acetic, propionic, citric, and tartaric acids; and strong phenolic acids such as picric acid. Since two basic nitrogen atoms are present in the molecule, these amines may form salts with one or two equivalents of acid, the particular acid salt obtained being dependent upon the quantity of acid added.

The compounds may be prepared by the condensation of a 1-alkyl-3-piperidone or a 1-alkyl-4-piperidone with benzyl amine at about room temperature with or without the presence of a solvent to form a 1-alkyl-3-benzyliminopiperidine or a 1-alkyl-4-benzyliminopiperidine, respectively, followed by catalytic hydrogenation of the reaction product. The benzyl amine can also contain substituents in the benzyl group, such as hydroxy, alkoxy, alkyl, amino, and the like. The condensation and hydrogenation are customarily conducted without the isolation of any intermediate product. The conditions for condensation and reduction as to temperature, pressure, hydrogenation catalyst, et cetera, are not critical. However, since the condensation and hydrogenation can both be conducted at room temperature, and since the hydrogenation can be conducted under a low hydrogen pressure, such as a pressure of the order of fifty pounds per square inch, using platinum oxide as a catalyst, the use of higher temperatures and hydrogen pressure, although operative, is not necessary. Other hydrogenation catalysts, e. g., Raney nickel or palladium on charcoal, can also be used. The products of the reaction are readily isolated by removal of the catalyst and fractional distillation of the liquid.

Salts of the amines can be formed by mixing a solution of a particular amine with a stoichiometric quantity of the selected acid and evaporating the solution to dryness. Other methods of preparing amine salts known to the art can also be used.

The following examples are illustrative of the invention but are not to be construed as limiting.

*Example 1*

To 177.9 grams of ethyl N-ethylaminoacetate was added with cooling 132.0 grams of ethyl γ-bromobutyrate. The reaction mixture was allowed to stand for three days at room temperature. The ethyl N-ethylaminoacetate hydrobromide which precipitated was removed by filtration. The residual liquid was distilled under a pressure of 20 millimeters of mercury, whereupon 109 grams of ethyl γ-(N-carbethoxymethyl-N-ethylamino)-butyrate distilling at 161–163 degrees centigrade; $n_D^{24}$ 1.4392, was obtained.

*Example 2*

The ester from Example 1 was cyclized by the technique of J. Am. Chem. Soc. 68, 1239 (1946) whereupon 1-ethyl-3-piperidone hydrochloride, melting at 172–173.5 degrees centigrade was obtained.

*Example 3.—1-ethyl-3-benzylaminopiperidine*

Forty and nine-tenths grams of 1-ethyl-3-piperidone hydrochloride and 23.4 mols of benzyl amine were thoroughly mixed at a temperature between 15 and 25 degrees centigrade. To the reaction mixture was then added 100 milliliters of methanol and about 0.2 gram of platinum oxide catalyst. The alcoholic solution was shaken under a hydrogen pressure of about 50 pounds per square inch at room temperature in a suitable apparatus, the absorption of hydrogen being complete after about one hour. The catalyst was removed and the resulting 1-ethyl-2-benzylaminopiperidine, boiling at 118-120 degrees centigrade at a pressure of 0.7 millimeter of mercury, was isolated by distillation; $n_D^{20}$ 1.5273. Its dipicrate melts at 200-202 degrees centigrade.

*Example 4.—1-Methyl-3-benzylaminopiperidine*

In a manner similar to Example 3 there was obtained from 1-methyl-3-piperidone (J. Am. Chem. Soc. 55, 1233 (19334)) and benzyl amine, 1-methyl-3-benzylaminopiperidine, boiling at 112-117 degrees centigrade at a pressure of 1 millimeter of mercury; $n_D^{23}$ 1.5299. It dipicrate melts at 191-193 degrees centigrade.

*Example 5.—1-Ethyl-4-benzylaminopiperidine and salts thereof*

Thirty-four and five-tenths grams of 1-ethyl-4-piperidone (J. Am. Chem. Soc. 68, 1239 (1946)) and 27.9 grams of benzyl amine were thoroughly mixed at a temperature between 15 and 25 degrees centigrade. To the reaction mixture was then added 50 milliliters of absolute alcohol and about 0.2 gram of Adam's platinum oxide catalyst. The alcoholic solution was shaken under a hydrogen pressure of about 50 pounds per square inch at room temperature in a suitable apparatus, the absorption of hydrogen being complete after about two hours. The catalyst was then removed by filtration and the resulting 1 - ethyl - 4 - benzylaminopiperidine, boiling at 113-115 degrees centigrade at a pressure of 0.2 millimeter of mercury, isolated by distillation. Its dipicrate melts at 227-228 degrees centigrade and the dihydrochloride melts at 303-304.5 degrees centigrade with decomposition.

*Example 6.—1-Methyl-4-benzylaminopiperidine and salts thereof*

In a manner similar to Example 5 there was obtained from 1-methyl-4-piperidone and benzyl amine, 1-methyl-4-benzylaminoperidine, boiling at 168-172 degrees centigrade at a pressure of 17 millimeters of mercury. Its dipicrate melts at 225.5-227 degrees centigrade with decomposition.

Other compounds which may be produced according to the precedure given in the foregoing examples and which are included within the scope of the invention, are the 1-alkyl-3-benzylaminopiperidines and the 1-alkyl-4-benzylaminopiperidines wherein the 1-alkyl group is propyl, isopropyl, butyl, or the like. These are prepared by employment in the process of the corresponding 1-alkyl-3-piperidone or 1-alkyl-4-piperidone.

I claim:

1. A compound selected from the group consisting of the 1-alkyl-benzylaminopiperidines having the formula

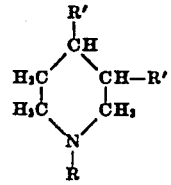

wherein R is an alkyl radical having from 1 to 7 carbon atoms, inclusive, one R' is hydrogen and the other R' is the benzylamino group, and acid addition salts thereof.

2. 1-Methyl-4-benzylaminopiperidine.
3. 1-Ethyl-3-benzylaminopiperidine.
4. An acid salt of 1-ethyl-4-benzylaminopiperidine.
5. 1-Ethyl-3-benzylaminopiperidine dipicrate.
6. The method which includes: hydrogenating under a pressure of hydrogen and in the presence of a hydrogenation catalyst a compound from the group consisting of the 1-alkyl-3-benzyliminopiperidines and the 1-alkyl-4-benzyliminopiperidines; and separating from the reaction mixture a 1-alkyl-benzylaminopiperidine having the formula

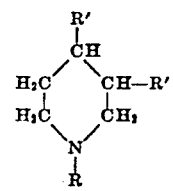

wherein R is an alkyl radical having from 1 to 7 carbon atoms, inclusive, one R' is hydrogen and the other R' is the benzylamino group.

ROBERT H. REITSEMA.

No references cited.